United States Patent [19]

Pachaly

[11] Patent Number: 5,130,400

[45] Date of Patent: Jul. 14, 1992

[54] PROCESS FOR PREPARING SPHERICAL, MONODISPERSED ORGANOPOLYSILOXANES OR SILICON OXYCARBIDES

[75] Inventor: Bernd Pachaly, Burghausen, Fed. Rep. of Germany

[73] Assignee: Wacker-Chemie GmbH, Munich, Fed. Rep. of Germany

[21] Appl. No.: 526,088

[22] Filed: May 21, 1990

[30] Foreign Application Priority Data

Jun. 1, 1989 [DE] Fed. Rep. of Germany ....... 3917898

[51] Int. Cl.⁵ .............................................. C08G 77/06
[52] U.S. Cl. ...................................... 528/21; 528/33; 423/337
[58] Field of Search ...................... 528/21, 33; 423/337

[56] References Cited

U.S. PATENT DOCUMENTS

| | | | |
|---|---|---|---|
| 4,408,030 | 10/1983 | Marko | 578/14 |
| 4,618,666 | 10/1975 | Porte | 528/33 |
| 4,824,651 | 4/1989 | Frey et al. | 556/430 |
| 4,833,220 | 5/1989 | Frey et al. | 528/33 |
| 4,889,904 | 12/1989 | Burns | 528/33 |

FOREIGN PATENT DOCUMENTS

| | | |
|---|---|---|
| 0089783 | 9/1983 | European Pat. Off. . |
| 0281964 | 9/1988 | European Pat. Off. . |
| 0298469 | 1/1989 | European Pat. Off. . |
| 0298470 | 1/1989 | European Pat. Off. . |
| 2634488 | 1/1990 | France . |

*Primary Examiner*—Melvyn I. Marquis

[57] ABSTRACT

The invention relates to a process for preparing spherical, monodispersed organopolysiloxanes, which comprises reacting an alkoxysilane of the general formula

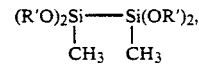

in which the R's are selected from the group consisting of methyl, ethyl, n-propyl, iso-propyl, n-butyl, sec-butyl or tert-butyl radicals, with water at a molar ratio of water to alkoxysilane of 40 moles:1 mole to 80 moles:1 mole, and a process for preparing spherical, monodispersed silicon oxycarbides from these organopolysiloxanes.

20 Claims, 1 Drawing Sheet

PROCESS FOR PREPARING SPHERICAL, MONODISPERSED ORGANOPOLYSILOXANES OR SILICON OXYCARBIDES

The present invention relates to spherical monodispersed organopolysiloxanes and more particularly to a process for preparing spherical, monodispersed organopolysiloxanes or silicon oxycarbides.

BACKGROUND OF THE INVENTION

Monolithic glasses containing carbon which have been obtained from gels of organosilesquioxanes of the general formula $RSiO_{3/2}$ are described in EP-A 107,943. The preparation of highly porous articles composed of methylalkoxydisilanes are described in EP-A 298,469. Silicon oxycarbide powders prepared from methylsilicic acid are described in EP-A 298,470.

It is an object of the present invention to provide finely divided particulate organopolysiloxanes or silicon oxycarbides having a narrow particle size distribution and a spherical particle shape. Another object of the present invention is to provide a process for preparing finely divided particulate organopolysiloxanes or silicon oxycarbides having spherical particle shapes from methylalkoxydisilanes.

SUMMARY OF THE INVENTION

The foregoing objects and others which will become apparent from the following description are accomplished in accordance with this invention, generally speaking, by providing a process for the preparation of spherical, monodispersed organopolysiloxanes, which comprises reacting an alkoxysilane of the general formula

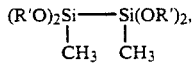

in which the R's, may be the same or different, and are selected from the group consisting of methyl, ethyl, n-propyl, iso-propyl, n-butyl, sec-butyl and tert-butyl radicals, with water in a molar ratio of water to alkoxysilane of 40 moles:1 mole to 80 moles:1 mole.

BRIEF DESCRIPTION OF THE DRAWINGS

FIG. 1 illustrates a highly porous gel,
FIG. 2 illustrates intergrown particles,
FIG. 3 illustrates coalesced aggregates,
FIG. 4 illustrates spherical, monodispersed particles.

DESCRIPTION OF THE INVENTION

The alkoxysilane having the general formula

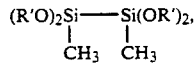

can be employed, if desired, in admixture with alkoxysilanes having the general formulas

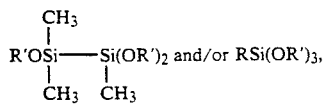

in which the R's can be the same or different and can be selected from methyl, ethyl, n-propyl, iso-propyl, n-butyl, sec-butyl, or tert-butyl radicals and R can be the methyl, ethyl, propyl, vinyl or phenyl radical.

Alkoxysilanes having the general formulas

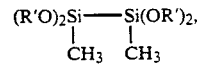

and

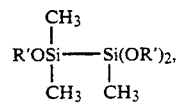

in which R' is the same as above, are readily available by the method of Hengge et al., Monatshefte für Chemie, 105, 671–683 (1984) or of W. H. Atwell et al., Journal of Organometallic Chemistry, 7, 71–78 (1967). The preferred alkoxysilanes are 1,2-dimethyltetramethoxydisilane and 1,1,2-trimethyltrimethoxydisilane.

Within the scope of this invention, spherical means that the particles have a globular shape.

Also, within the scope of this invention, monodispersed means that the particles have a narrow particle size distribution, i.e., the diameters of the individual particles are scarcely scattered about a mean value.

In preparing the spherical, monodispersed organopolysiloxanes of this invention, the sol-gel process can be carried out in the presence of an alcohol, which makes it possible to influence the average particle diameter. Preferred examples of alcohols are ethanol and isopropanol, with methanol being the preferred alcohol.

The preferred parameters for the preparation of the organopolysiloxanes are:

Composition per mole of alkoxysilane component:

0 to 80 moles, and more preferably from 0 to 40 moles, of alcohol and 40 to 80 moles, and more preferably from 40 to 50 moles, of water.

Temperature:

10° to 60° C., and more preferably from 20° to 30° C.

After the alkoxysilane, water and, if desired, alcohol have been mixed, it is preferred that the pH be adjusted to a value of from 5.0 to 9.0, and more preferably from 6.0 to 8.0, by adding a base, such as aqueous ammonia. After the solution has gelled, the siloxane powder is preferable isolated by filtration or centrifugation and is dried under normal pressure or in vacuo, preferably from 20° to 150° C., and more preferably from 25° to 100° C.

Figure 1:
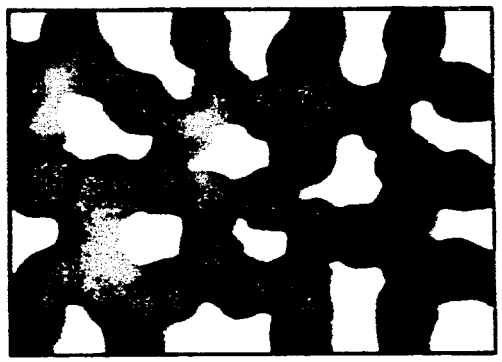
FIGS. 1 to 4 illustrate the distribution of particle shapes obtained by the sol-gel process for preparing organopolysiloxanes.
Figure 2:
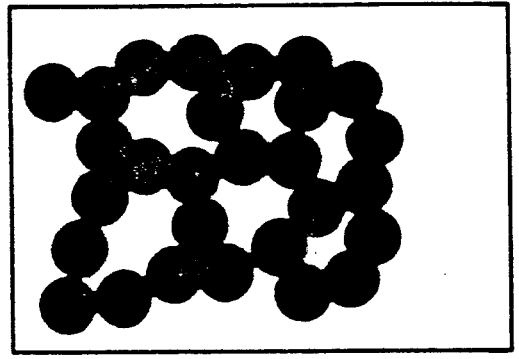
Figure 3:
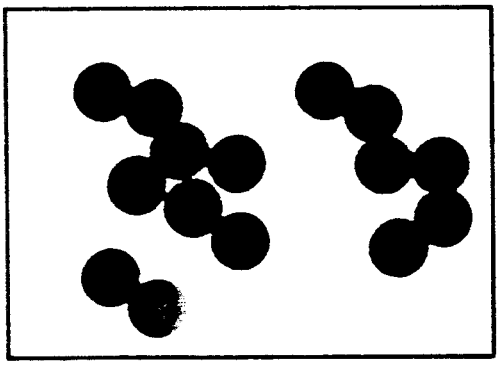
Figure 4:
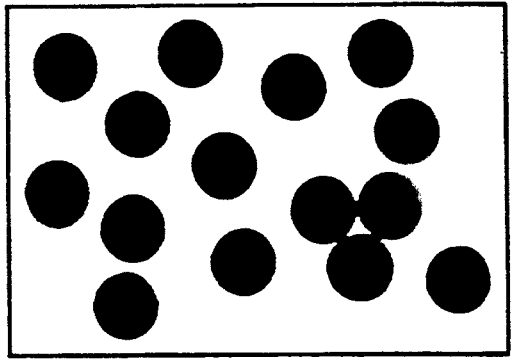

The ratio of alkoxysilane to water in the sol-gel process is a critical factor in the preparation of the organopolysiloxanes. At a molar ratio of 6 moles of water to 1 mole of alkoxysilane a highly porous gel is obtained (see FIG. 1). As a result of increasing the amount of water, surprisingly, a pulverulent product is formed which, at 8 moles of water to 1 mole of alkoxysilane, is composed, however, of intergrown particles (see FIG. 2). At 20 moles of water to 1 mole of alkoxysilane coalesced aggregates are still formed (see FIG. 3), and only from 40 moles of water to 1 mole of alkoxysilane are isolated, spherical and monodispersed particles formed (see FIG. 4).

The invention also relates to a spherical, monodispersed organopolysiloxane composed of units of the formula $$R-\underset{\underset{CH_3}{|}}{Si}O,$$

in which R can be a radical having the formulas $$-\underset{\underset{CH_3}{|}}{Si}O \quad \text{or} \quad -\underset{\underset{CH_3}{|}}{\overset{\overset{CH_3}{|}}{Si}}O_{1/2}$$

which is attached via a silicon-silicon single bond, and prepared by reacting an alkoxysilane of the general formula $$(R'O)_2Si\underset{\underset{CH_3}{|}}{\underset{|}{\phantom{X}}}\underset{\underset{CH_3}{|}}{\underset{|}{Si}}(OR')_2,$$

in which the R's are selected from the methyl, ethyl, n-propyl, iso-propyl, n-butyl, sec-butyl or tert-butyl radicals, and if desired in admixture with an alkoxysilane of the general formula $$R'O\underset{\underset{CH_3}{|}}{\underset{|}{Si}}\underset{\underset{CH_3}{|}}{\underset{|}{\phantom{X}}}Si(OR')_2.$$

in which the R's are the same as above, with water, and if desired in the presence of an alcohol, at a molar ratio of water to alkoxysilane of from 40 moles:1 mole to 80 moles:1 mole.

The preferred spherical, monodispersed organopolysiloxanes have average particle diameters of from 1 to 5 μm, and more preferably from 2 to 4 μm; BET specific surface areas of from 1 to 4 m²/g, and more preferably from 1.5 to 3 m²/g; bulk densities of from 200 to 500 g/l, and more preferably from 250 to 400 g/l; and material densities of from 1.0 to 1.4 g/cm³, and more preferably from 1.2 to 1.3 g/cm³.

Another embodiment of this invention is the pyrolysis of the organopolysiloxanes to give the corresponding silicon oxycarbides.

Thus, the invention also relates to a process for the preparation of spherical, monodispersed silicon oxycarbides, which comprises reacting under a non-oxidizing atmosphere or in vacuo at temperatures within the range of from 700° to 1500° C., spherical, monodispersed organopolysiloxanes obtainable by reacting an alkoxysilane of the general formula $$(R'O)_2Si\underset{\underset{CH_3}{|}}{\underset{|}{\phantom{X}}}\underset{\underset{CH_3}{|}}{\underset{|}{Si}}(OR')_2,$$

in which the R's, are selected from the group consisting of methyl, ethyl, n-propyl, iso-propyl, n-butyl, sec-butyl or tert-butyl radicals and if desired in admixture with an alkoxysilane having the general formulas $$R'O\underset{\underset{CH_3}{|}}{\underset{|}{Si}}\underset{\underset{CH_3}{|}}{\underset{|}{\phantom{X}}}Si(OR')_2 \text{ and/or } RSi(OR')_3,$$

in which the R's are the same as above and R can be the methyl, ethyl, propyl, vinyl or phenyl radicals, with water and if desired in the presence of an alcohol, at a molar ratio of water to alkoxysilane of from 40 moles:1 mole to 80 moles:1 mole.

The preferred temperature range is within the range of from 1000° to 1300° C.

In the pyrolysis step a reproducible shrinkage in volume of from 15 to 25 percent by volume and a reproducible loss in weight of from 10 to 30 percent by weight takes place. The reaction is carried out under a non-oxidizing atmosphere, i.e. under an inert atmosphere, such as nitrogen or argon, or under a reducing atmosphere, such as carbon monoxide or hydrogen, or protective gas or in vacuo, discontinuously preferably in tubular or chamber furnaces, or continuously preferably in continuous furnaces or in tubular furnaces arranged vertically with a discharge device.

It is possible to show by thermogravimetric measurement of an organopolysiloxane under helium that the chemical transformation process is complete at 800° C. At a higher temperature morphological changes take place which have an influence on the mechanical and chemical properties. The resulting silicon oxycarbides have the general composition $C_aSiO_b$ in which a can be 0.5 to 1.2 and b can be 0.75 to 1.1, depending on the alkoxysilane employed, the reaction parameters and the pyrolysis conditions. Specific surface areas and bulk densities depend on the average particle diameter.

Preferred spherical, monodispersed silicon oxycarbides have average particle diameters of from 1 to 4 μm, preferably from 2 to 3.5 μm; BET specific surface areas of from 1 to 5 m²/g, preferably from 2 to 3.5 m²/g; bulk densities of from 300 to 700 g/l, preferably from 400 to 600 g/l; and material densities of from 1.9 to 2.3 g/cm³, preferably from 2.2 to 2.3 g/cm³.

Silicon oxycarbides are used as raw materials for ceramic materials produced by powder technology, as fillers for ceramic coatings and adhesives, as lapping and polishing agents, and as supports for ion exchangers, catalysts or biocatalysts by the method of surface modification with functional silanes and in chromatography, for example as in-line filters.

EXAMPLES 1 to 7

Concentrated ammonia solution was added, after a stirring time of 30 minutes at 20° C., to mixtures of the following compositions prepared from 1,2-dimethyltetramethoxydisilane, completely desalinated water and methanol, until initial pH of 4.5 had been adjusted to a pH of 7. An organopolysiloxane gel was formed after a few minutes and then was centrifuged at 4000 r.p.m. and dried at 25° C.

| Example | Moles of disilane | Moles of water | Moles of methanol | Reaction product |
|---|---|---|---|---|
| 1 | 0.1 | 0.4 | 0.4 | impermeable gel |
| 2 | 0.1 | 0.6 | 0.4 | porous gel |
| 3 | 0.1 | 0.8 | 0.4 | pulverulent gel |
| 4 | 0.1 | 1.2 | 0.4 | agglomerated powder |
| 5 | 0.1 | 2.0 | 0.4 | agglomerated |

-continued

| Example | Moles of disilane | Moles of water | Moles of methanol | Reaction product |
|---------|-------------------|----------------|-------------------|------------------|
| 6 | 0.1 | 3.2 | 0.4 | powder agglomerated powder |
| 7 | 0.1 | 4.0 | 0.4 | spherical, monodisperse powder |

EXAMPLES 8 to 13

The mixtures of the following compositions were reacted in accordance with the procedure described in Examples 1 to 7, and the particle diameter in the moist product was measured in a light microscope.

| Example | Moles of disilane | Moles of water | Moles of methanol | Average particle diameter ($\mu$m) |
|---------|-------------------|----------------|-------------------|-----------------------------------|
| 8 | 0.1 | 4.0 | 0 | 3.5 |
| 9 | 0.1 | 4.0 | 0.8 | 3.0 |
| 10 | 0.1 | 4.0 | 1.6 | 2.5 |
| 11 | 0.1 | 4.0 | 2.4 | 2.0 |
| 12 | 0.1 | 4.0 | 3.2 | 1.5 |
| 13 | 0.1 | 4.0 | 4.0 | 1.0 |

EXAMPLE 14

An organopolysiloxane prepared in accordance with the procedure of Example 11 was separated from the liquid by centrifuging at 4000 r.p.m. and dried at 25° C. About 11.0 g of powder were obtained from 21.0 g of 1,2-dimethyltetramethoxydisilane. This powder was heated to 1300° C. in a tubular furnace flushed with argon at 140° C./hour, and was kept at this temperature for 5 hours. About 9.9 g of a black silicon oxycarbide having a bulk density of 570 g/l and a BET specific surface area of 1.5 m²/g were obtained. The chemical composition was 17.1% by weight of carbon, 50.7% by weight of silicon and 32.3% by weight of oxygen. The average particle diameter was 2 $\mu$m.

EXAMPLE 15

A silicon oxycarbide prepared from 26.6 g of 1,2-dimethyltetraethoxydisilane in accordance with the procedure of Example 14 had an average particle diameter of 1 $\mu$m and a bulk density of 470 g/l and a BET surface area of 3.0 m²/g. The chemical composition was 17.2% by weight of carbon, 50.7% by weight of silicon and 32.1% by weight of oxygen.

EXAMPLE 16

An organopolysiloxane prepared in accordance with the procedure of Example 8 had the following particle size distribution parameters:
$d_{10} = 3.0$ $\mu$m
$d_{50} = 3.4$ $\mu$m
$d_{90} = 3.8$ $\mu$m.

After pyrolysis in a tubular furnace flushed with argon at 1200° C., a silicon oxycarbide having the following particle size distribution parameters was obtained:
$d_{10} = 2.6$ $\mu$m
$d_{50} = 2.9$ $\mu$m
$d_{90} = 3.2$ $\mu$m

What is claimed is:

1. A process for preparing spherical, monodispersed organopolysiloxanes having average particle diameters of from 1 to 5 $\mu$m, which comprises reacting an alkoxysilane of the formula

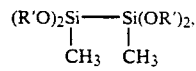

in which R' is selected from the group consisting of the methyl, ethyl, n-propyl, iso-propyl, n-butyl, sec-butyl and tert-butyl radicals, with water at a molar ratio of water to alkoxysilane of 40 moles:1 mole to 80 moles:1 mole.

2. The process of claim 1, wherein the alkoxysilane having the formula

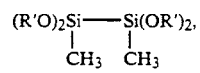

is employed in admixture with an alkoxysilane selected from the group consisting of

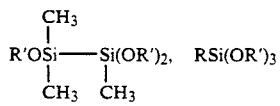

and mixtures thereof in which R' is selected from the group consisting of methyl, ethyl, n-propyl, iso-propyl, n-butyl, sec-butyl and tert-butyl radicals and R is selected from the group consisting of methyl, ethyl, propyl, vinyl and phenyl radicals.

3. The process of claim 1, wherein 1,2-dimethyltetramethoxydisilane is employed.

4. The process of claim 2, wherein an alkoxysilane mixture is employed containing 1,2-dimethyltetramethoxydisilane and 1,1,2-trimethyltrimethoxydisilane.

5. The process of claim 1, wherein the reaction is carried out in presence of an alcohol.

6. The process of claim 2, wherein the reaction is carried out in the presence of an alcohol.

7. The process of claim 5, wherein the reaction is carried out in the presence of methanol.

8. The process of claim 6, wherein the reaction is carried out in the presence of methanol.

9. The process of claim 1, wherein from 0 to 80 moles of alcohol and from 40 to 80 moles of water are employed per mole of alkoxysilane.

10. The process of claim 2, wherein from 0 to 80 moles of alcohol and from 40 to 80 moles of water are employed per mole of alkoxysilane.

11. The process of claim 2, wherein after the alkoxysilane and water have been mixed, the mixture is adjusted to a pH value of from 5 to 9 by the addition of a base.

12. The process of claim 2, wherein after the alkoxysilane and water have been mixed, the mixture is adjusted to a pH value of from 5 to 9 by the addition of a base.

13. The process of claim 5, wherein after the alkoxysilane, water and alcohol have been mixed, the mixture is adjusted to a pH value of from 5 to 9 by the addition of a base.

14. The process of claim 6, wherein after the alkoxysilane, water and alcohol have been mixed, the mixture is adjusted to a pH value of from 5 to 9 by the addition of a base.

15. The process of claim 1, wherein the reaction is carried out at 10°–60° C.

16. The process of claim 2, wherein the reaction is carried out at 10°–60° C.

17. The process of claim 5, wherein the reaction is carried out at 10°–60° C.

18. The process of claim 6, wherein the reaction is carried out at 10°–60° C.

19. A spherical, monodispersed organopolysiloxane having an average particle diameter of from 1 to 5 μm and contains units of the formula $$\begin{array}{c} R-SiO, \\ | \\ CH_3 \end{array}$$

in which R is selected from the group consisting of radicals of the formulas $$\begin{array}{c} CH_3 \\ | \\ -SiO \\ | \\ CH_3 \end{array} \text{ and}$$

$$\begin{array}{c} CH_3 \\ | \\ -SiO_{1/2} \\ | \\ CH_3 \end{array}$$

which is attached via a silicon-silicon single bond in which the spherical, monodispersed organopolysiloxane is prepared in accordance with the process of claim 1.

20. A process for preparing spherical, monodispersed silicon oxycarbide, which comprises reacting, the spherical, monodispersed organopolysiloxane of claim 19 under a non-oxidizing atmosphere or in vacuo at temperatures within the range from 700° to 1500° C.

* * * * *